United States Patent [19]

Laskaris et al.

[11] Patent Number: 5,042,442
[45] Date of Patent: Aug. 27, 1991

[54] INTERNAL COMBUSTION ENGINE

[75] Inventors: Michael A. Laskaris, Collegeville; Kalman Broitman, Dresher; Salvatore E. Natale, Collegeville, all of Pa.

[73] Assignee: Hale Fire Pump Company, Conshohocken, Pa.

[21] Appl. No.: 507,671

[22] Filed: Apr. 10, 1990

[51] Int. Cl.$^5$ .............................................. F02B 5/00
[52] U.S. Cl. ................................... 123/305; 123/304; 123/73 C; 123/179 BG
[58] Field of Search ................ 123/1 A, 73 C, 305, 123/304, 491, 666, 576, 179 BG, 299, 145 A, 418, 78 R

[56] References Cited

U.S. PATENT DOCUMENTS

| | | | |
|---|---|---|---|
| 1,988,784 | 1/1935 | Sleffel | 123/299 X |
| 2,473,171 | 6/1949 | Ostling | 123/418 |
| 3,154,059 | 10/1964 | Witzky et al. | 123/299 X |
| 4,187,825 | 2/1980 | Loyd, Jr. | 123/305 X |
| 4,446,830 | 5/1984 | Simko et al. | 123/299 X |
| 4,480,611 | 11/1984 | Wendt | 123/78 R X |
| 4,545,346 | 10/1985 | Grow | 123/305 |
| 4,712,525 | 12/1987 | Ishida | 123/145 A |
| 4,790,270 | 12/1988 | McKay et al. | 123/73 C |
| 4,800,862 | 1/1989 | McKay et al. | 123/73 C |
| 4,807,572 | 2/1989 | Schlunke | 123/73 C |
| 4,899,699 | 2/1990 | Huang et al. | 123/305 X |
| 4,926,806 | 5/1990 | Ahern et al. | 123/305 X |

FOREIGN PATENT DOCUMENTS 0285665  1/1971  U.S.S.R. .................. 123/73 C

Primary Examiner—E. Rollins Cross
Assistant Examiner—Thomas N. Moulis
Attorney, Agent, or Firm—Frank A. Follmer

[57] ABSTRACT

A two-stroke, two-cylinder internal combustion engine for use in portable applications has a cylinder head design, a fuel injection system and an ignition system which enables the engine to start and run on a fuel such as JP5 or DFM.

10 Claims, 2 Drawing Sheets

INTERNAL COMBUSTION ENGINE

BACKGROUND AND SUMMARY OF THE INVENTION

This invention relates generally to internal combustion engines and, more particularly, to internal cumbustion engines for use in applications on board ships wherein the engine is used in a portable pump power system for damage control and firefighting purposes.

An engine of the indicated types must be capable of producing sufficient horsepower, must be light in weight, and must be capable of running on fuel of low volatility, such as diesel (DFM) or kerosene (JP5) type of fuel as opposed to gasoline which is highly flammable. Present-day diesel engines in a suitable horsepower range (of the order of 50 bhp) are much too large and heavy for portable applications. Further, present-day diesel engines do not have the ability to start unassisted at very low temperatures.

An internal combustion engine for use in portable applications of the indicated type would desirably meet the following criteria;
  (1) The engine must be capable of starting without external power over a wide temperature range, i.e., from −21° F. to +140° F.
  (2) The engine must make about 48–50 horsepower at a speed not to exceed 6000 RPM.
  (3) The engine must be capable of running on either JP5 fuel or DFM fuel.
  (4) The above criteria must be met without the use of a battery or other external power source (other than manual) for starting of the engine.

It is the general object of this invention to provide an engine that meets the above-listed criteria and is suitable for use in a portable pump power system on board ship for damage control and firefighting purposes.

In accordance with the general object of the invention there is provided a novel and improved cylinder head, fuel system and ignition system for use on a commerical two-stroke internal combustion engine.

Briefly stated, the novel engine design in accordance with the invention utilizes the diesel technology of injecting the fuel directly into the combustion chamber combined with the flame front burning characteristics of a gasoline engine. The direct injection controls the fuel to allow high power (high cylinder pressure) operation without detonation by stratifying the fuel in the combustion chamber. Accordingly, the fuel/air mixture away from the fuel injector and spark plug is leaner and unable to detonate. The direct injection sprays two streams of fuel adjacent to the spark plug so that the misting effect from the injector allows ignition energy of the spark plug to ignite a very small amount of fuel in the combustion chamber. This flame front spreads across the combustion chamber becoming more effective in burning the fuel as the engine heats up. The direct injection avoids detonation at higher powers (higher combustion pressures) by controlling the dispersal of fuel in the combustion chamber.

The relationship between the spark plug and the fuel injector spray pattern is most critical for cold starting and power. The fuel injection spray plumes must be close enough to the spark plug so that a fine mist of fuel is available at the spark plug for ignition purposes. At the same time, the fuel injection spray plumes must not be too close so that the fuel is too close or impinges directly on the spark plug so that it will become wetted and will not fire properly. Accordingly, the plume angle and the distance from the spark plug (as well as the plume shape) are important to the proper starting characteristics.

In accordance with the general object of the invention, the combustion chamber design is such that it achieves the proper performance desired. To this end, an open combustion chamber design allows spent exhaust gases to be scavenged efficiently for better power at high engine speeds. Thus, the combustion chamber consists of a simple bowl with the injector and the spark plug located within the bowl.

In order that the engine both start reliably and produce high power, there is provided a variable fuel injection timing system. For starting purposes, the fuel injection and the spark are timed so that both occur at a time close to one another and close to the piston top dead center (TDC) position. However, as the throttle is increased, the ignition timing is increased to 20° before top dead center (BTDC) while the injection timing is increased at a greater rate up to 150°–180° before top dead center (BTDC).

In accordance with another feature, the engine oil is injected at the intake manifold so that the crankcase of the engine is occupied by an oil/air mixture. It is important that no fuel is in the crankcase because JP5, unlike gasoline, does not readily evaporate from the oil whereby the JP5 dilutes the engine oil and therefore reduces engine life. This problem is avoided by injecting all the fuel into the cylinder head as described above.

It is noted that the various engine modifications and improvements as described above are all restricted to the cylinder head, the fuel system and the ignition system. Thus, these improvements can be applied to a stock cylinder block wherefore it is possible to refit the system of the invention to almost any gasoline two cycle engine. Accordingly, the engine in accordance with the invention can utilize a production cylinder block with its years of field and production experience as opposed to constructing a completely new engine. Further, the engine of the invention has enhanced reliability and can be produced at an acceptable cost.

It is noted that an engine in accordance with the invention can be constructed of a piston-type internal combustion engine weighing less than 100 pounds and producing up to 50 bhp.

DETAILED DESCRIPTION OF THE PREFERRED EMBODIMENT

Figure 4:
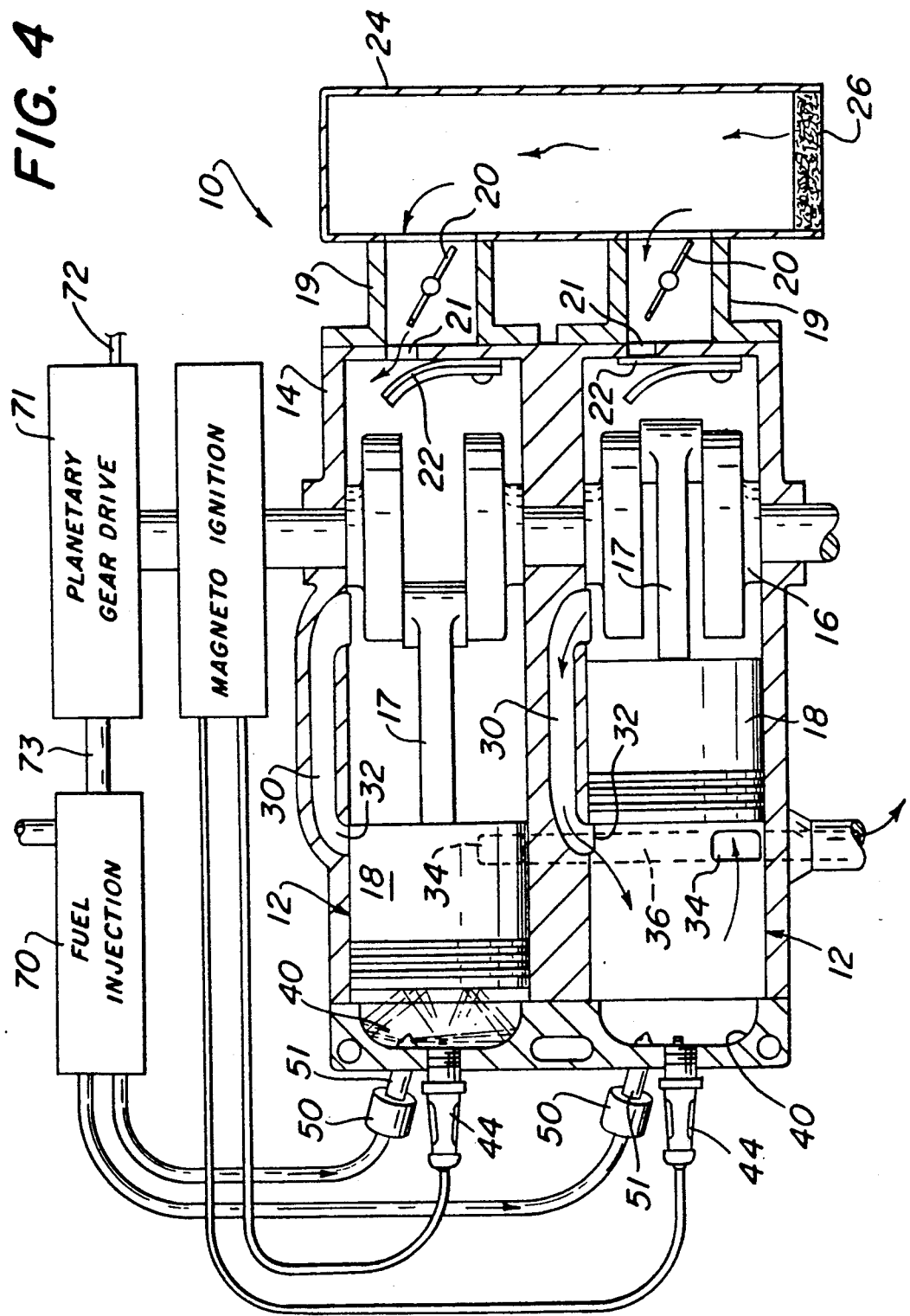
FIG. 4 is a partly schematic view illustrating the two cylinders of the internal combustion engine in accordance with the invention.

In the drawings there is shown the modifications in accordance with the invention that are made to an otherwise commercial two-stroke, two-cylinder internal combustion engine, which modifications result in the ability to run the engine on JP5 fuel. One commercially available engine that is suitable for modification in accordance with the invention is the OMC Model 55C manufactured by the Outboard Marine Corporation, said engine comprising a standard cylinder block provided with a water cooling jacket. As is shown in FIG. 4, the engine 10 comprises two cylinders 12 and a crankcase 14 containing a crankshaft 16 connected by connecting rods 17 to the pistons 18 which move within their associated cylinders 12 through a first stroke from a top dead center position to a bottom dead center position and through a second stroke from the bottom dead center position back to said top dead center position. The air for combustion is supplied to the interior of the crankcase 14 by way of an intake manifold 19, the air flow being controlled by a throttle valve 20 associated with each cylinder 12. The flow from each throttle valve 20 is checked by a leaf valve 22 at the inlet port 21 to the part of the crankcase 14 associated with each cylinder 12. The air supply to the throttle valves 20 passes through an air filter 24 containing a filter screen 26.

There is also provided the usual transfer passage means which provides a passage 30 for the flow of air from the interior of the crankcase 14 to the inlet port 32 on the side of the cylinder 12. In FIG. 4, wherein the cylinder is shown partly schematically, there is only shown a single inlet port 32 whereas in an actual engine there are typically provided three such ports. There is also provided an exhaust port 34 located on the opposite side of the cylinder 12 from the inlet port 32 and connected to passage means 36 for exhausting the burned gases from the cylinders 12. The above-described arrangement is typical in a conventional engine. Also, the operation is generally conventional and is similar to that of a conventional crankcase-scavenged, two-stroke engine such as that shown in FIG. 4.

The operation of the two-stroke engine will be explained with reference to FIG. 4 which shows such an engine wherein the crankcase 14 is hermatically sealed so that it can function as a pump in conjunction with the pistons 18. Thus, when the piston 18 ascends, a partial vacuum is produced in the crankcase cavity below said piston to thereby open the associated leaf valve 22 and thus provide an opening for the fresh combustion air to flow into the crankcase 14. At the start of the first stroke, the piston 18 is in its highest position, i.e., top dead center or TDC. When the compressed fuel/air mixture over the piston 18 is ignited, the piston 18 is thrust downward and, in so doing, releases the exhaust port 34. The burned gases in the cylinder 12, which are still under high pressure, can thus escape through exhaust port 34. When the piston 18 descends further, its upper edge releases the inlet port 32 which admits fresh combustion air into the cylinder so that the remaining burned gases are flushed out. When the piston 18 rises again (the second stroke), all the ports (i.e., inlet port 32 and exhaust port 34) are closed for a time, and during this period, the fuel/air mixture is compressed and ignited so that a fresh cycle can commence. Further, when the piston 18 descends, the fresh air in the crankcase cavity therebeneath is compressed a little so that as soon as the top of the piston releases the inlet port 32 at the end of the transfer passage 30 connecting the crankcase cavity to the cylinder, such fresh air can enter the cylinder 18. Further, as the piston 18 moves downwardly to compress the air in the crankcase cavity therebeneath, the leaf valve 22 associated therewith is closed and air is forced upward through the transfer passage 30 and inlet port 32 to expell any remaining burned gas vapor through the exhaust port 34. It is noted that during this movement of piston 18, the associated leaf valve 22 prevents the air in the crankcase cavity from backing out into the intake manifold.

Figure 2:
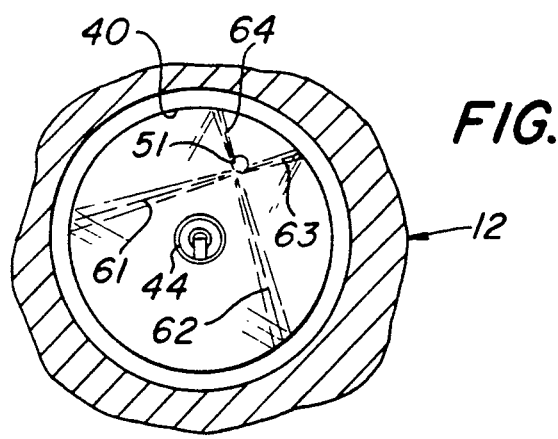
FIG. 2 is a sectional view taken generally on line 2—2 of FIG. 1.

In accordance with the invention there is provided a cylinder head on the top end of each engine cylinder in the shape of an open bowl 40. This produces an open combustion chamber design which allows spent gases to be scavenged efficiently for better power at high engine speeds. Further, bowl 40 is provided with a fuel injector 50 and spark plug 44 located within the bowl. This arrangement is best shown in FIG. 2. The open type combustion chamber used in the design in accordance with the invention is referred to as "open" by reason of the fact that it is a simple bowl wherein the mouth is wider than the sidewall portion thereof. This differs from the standard combustion chambers used in diesel engines which utilize a combustion chamber having a re-entering shape which has a mouth smaller than the sidewall portion thereof.

In accordance with the invention, each cylinder 12 is provided with a spark plug 44 positioned centrally within bowl 40 at the top end of the cylinder 12 as is shown in the Drawings. The spark plug is constructed to provide a spark of sufficient intensity to ensure complete combustion of the fuel/air mixture compressed in the cylinder 12 by the piston action.

The electric current is supplied to the spark plug by a conventional ignition means which is provided with an electric current generating means and means for timing the spark. Briefly, such means comprises a magneto breakless compacitor discharge system wherein the charge of electricity is generated by magnets in a flywheel rotating past a charge coil. The ignition means is operatively connected to the crankshaft 16 used for driving the same and for timing purposes as is conventional. Since the engine has two cylinders 12, there are provided two spark plugs 44 and two ignition coils and the charge from the ignition means is routed to the proper coil at the proper time. Briefly, the spark plugs are alternately fired to provide the proper engine timing.

Figure 1:
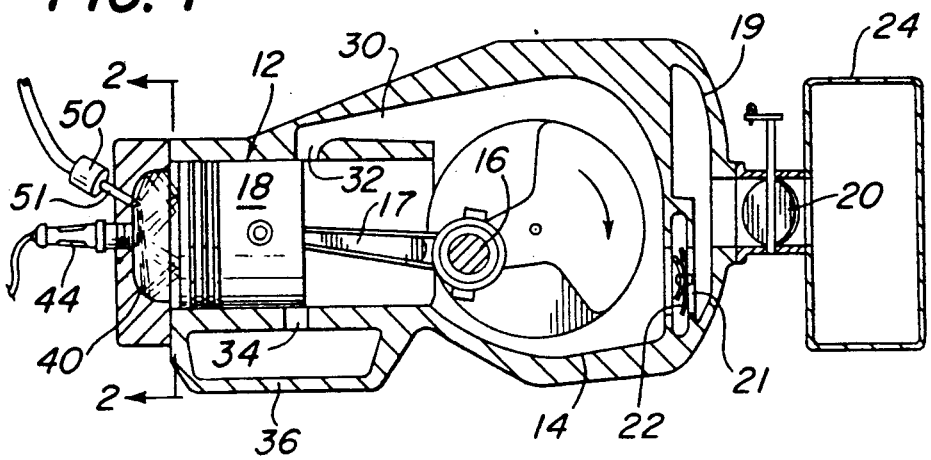
FIG. 1 is a sectional view showing one cylinder of an internal combustion engine in accordance with the invention.

In accordance with the invention there is provided means for injecting the JP5 fuel into the top end of the engine cylinder 12 at a location adjacent the spark plug 44. Such fuel injecting means includes a fuel injector 50 having an injection nozzle 51 having a plurality of nozzle openings in the end thereof. As shown in FIGS. 1 and 2, and injection nozzle 51 is located in the bowl 40 to be spaced apart from the spark plug 44 and on the side of the cylinder 12 closest the inlet port 32. The injection nozzle 51 is provided with four nozzle openings at its end constructed and arranged to inject four plume-like sprays 61, 62, 63 and 64 of fuel in atomized form into the top end of the engine cylinder 12 in the arrangement shown in FIGS. 1 and 2. Referring to these figures, two of the nozzle openings are arranged to direct sprays 61 and 62 from the nozzle and to diverge and pass along the opposite sides of the spark plug 44. The other two nozzle openings are arranged to direct sprays 63 and 64 from the nozzle and against the sidewall of bowl 40 to be deflected back toward the center of cylinder 12. During starting the sprays 63 and 64 are deflected back into contact with the piston 18 and then across the spark plug 44 to thereby form a cloud of fuel over the spark plug 44 to enhance the ignition conditions during the starting of the engine. The flow from the nozzle openings is illustrated by the flow lines in FIGS. 1 and 2.

The direct injection of the fuel as described above controls the fuel to allow high power (high cylinder pressure) operation without detonation by stratifying the fuel in the combustion chamber, i.e., the fuel/air mixture away from the fuel injector 50 is leaner and unable to detonate.

Further, the relationship between the spark plug 44 and the fuel injector spray pattern is most critical for cold starting and power operation. The fuel injection sprays 61 and 62 must be close enough to the spark plug 44 that a fine mist of fuel is available at the spark plug 44 for ignition. However, these sprays 61 and 62 must not be too close so they impinge directly on the spark plug 44 and thereby wet the same whereby it will not fire properly. By way of an example, with a cylinder 12 having about a 3⅛ inch diameter, the distance between the center line of the spark plug 44 (which is located centrally within the cylinder 12) and the center line of the injection nozzle 51 is approximately ⅜ inch. Further, the direction of sprays 61–64, as viewed in elevation in FIG. 1, are such that the sprays 61 and 62 are directed toward the spark plug 44 to pass alongside the end of the spark plug 44 and so that the sprays 63 and 64 are directed away from the spark plug toward the sidewall of the bowl 40 so as to bounce off the sidewall of the bowl 40 thereby atomizing further and clouding the spark plug 44 with fuel droplets as they subsequently bounce off the piston 18. As viewed in FIG. 2, the path of the two sprays 61 and 62 directed toward the spark plug 44 are arranged to straddle the spark plug 44 to provide "fuel misting" on at least two sides thereof thereby increasing changes for ignition. These two sprays 61 and 62 are directed on paths extending from nozzle 51 at an angle of 90° as shown in FIG. 2. Likewise, the sprays 63 and 64 directed away from the spark plug 44 are also at a 90° angle. Further, all the sprays 61–64 are spaced apart equidistantly circumferentially around the nozzle 51 as is apparent from FIG. 2.

To summarize, the injection nozzle spray arrangement produces a three dimensional spray pattern because the sprays bounce off the walls of the bowl 40 and the piston 18 to spread fuel throughout the combustion chamber very effectively. This produces a cloud around the spark plug 44 without actually touching or wetting the spark plug 44 to thereby provide for good ignition and an ignition which is spread out throughout the combustion chamber. The object is to get the fuel to ignite and to this end there is provided very finely atomized fuel. In order to achieve this without actually wetting the spark plug 44, the spray pattern comprises sprays 63 and 64 which bounce off the walls of bowl 40 so that the plume-shaped sprays go to either side of the spark plug 44 whereby a very finely atomized fuel is produced that only exists for a very short period of time as the fuel is being injected. The arrangement is such that the atomized fuel is produced right as it bounces off the walls of bowl 40 in the vicinity of the spark plug 44.

If the fuel droplets are too large, too much energy is required to ignite them, i.e., more energy than the spark plug 44 is capable of delivering. Thus, it is very important to break the fuel down into tiny, very small molecules or droplets so that there is enough energy in a conventional, or even a high energy spark plug and ignition system, to ignite the fuel reliably, especially in the colder temperatures.

Means are provided for supplying fuel to the injector at the proper time during the movement of the piston 18 through said strokes thereof. Such means is shown schematically in FIG. 4 and includes a fuel injection pump 70 driven through a shaft 73 by a planetary gear drive 71 operatively connected to the crankshaft 16 to be responsive thereto for timing the injection of the fuel. Gear drive 71 has a lever 72 extending from a ring gear on the outside thereof and connected to an offset cam whereby the timing of the fuel injection pump can be changed by moving lever 72. The cam is also hooked to the throttle linkage so that the timing can be changed as the throttle setting of the engine is increased. In the novel timing in accordance with the invention, the fuel injection and spark are timed to be closed to each other and close to the piston top dead center position for starting purposes. As the throttle is increased, the ignition timing is increased to only about 20° before top dead center (BTDC) while the injection timing is increased at a substantially greater rate up to 150°–180° before top dead center (BTDC). This is achieved by the offset cam attached to the throttle.

FIG. 1 illustrates the starting timing arrangement. In the following description the designation BTDC refers to the crankshaft angle before the piston reaches top dead center, which designation is conventionally used in the art.

FIG. 1 illustrates the timing starting condition. Thus, the piston is close to top dead center, approximately 20°–25° BTDC, and the inlet and exhaust ports are closed off. Accordingly, when the fuel is injected at 20°–25° BTDC, it is injected into a quiescent combustion chamber, which chamber will effectively allow the sprays to be controlled right around the spark plug as described above to improve the starting ignition. It is to be noted that the spark plug 44 will not be ignited until the piston reaches only a few degress before top dead center whereby the fuel has time to cloud over the spark plug but not enough time to condense on the cool walls of the combustion chamber.

Figure 3:
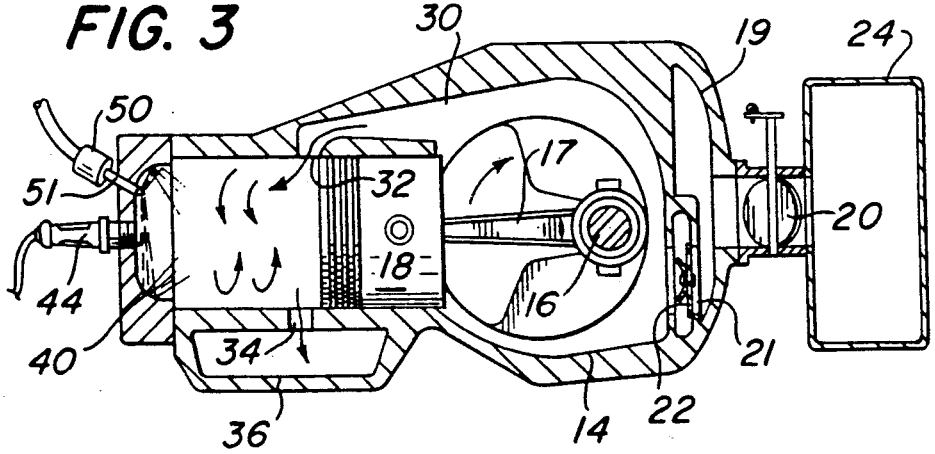
FIG. 3 is a sectional view of the cylinder shown in FIG. 1 with the piston in another position.

FIG. 3 illustrates the injection timing when the engine is running at full speed. This figure shows that the fuel is injected much sooner in the engine cycle, such as about 150°–180° BTDC. One reason it is necessary to inject the fuel so early is that you have only five thousandths of a second to get all the fuel into the combustion chamber at these high speeds before the piston 18 is moved too far and closes off the ports. It is noted that the spark will generally not occur until much later in the piston movement, such as up to about 20° BTDC. Another reason that the injection is earlier at high speeds is to take advantage of the turbulence of all the intake air that comes in from the inlet port 32, which turbulence is shown in the drawings where the flow lines show the air coming into the combustion chamber and the turbulence created by that flow as the chamber is scavenged. Further, this allows the fuel to mix very rapidly with the combustion air in order to produce the high power in the five thousandths of a second time period.

Set forth below is a chart illustrating the timing of the fuel injection and the spark plug ignition for a forty-five cubic inch, two-cylinder engine with a tuned exhaust system.

| ENGINE SPEED/POWER | IGNITION TIMING | FUEL INJECTION TIMING |
| --- | --- | --- |
| IDLE: 400-600 RPM | 4° BTDC | 20-25° BTDC |
| MID-RANGE: 2500 RPM | 10-15° BTDC | 50-90° BTDC |
| FULL POWER: 5500 RPM | 19-20° BTDC | 150-180° BTDC |

In the above chart, the idle speed timing is for a hand starting setting and the mid-range timing is for a mid range power limited to 20-25 BHP. Also, the full power timing figures relate to full power at about 50 BHP.

In the engine shown in FIG. 4 is is noted that the engine oil is injected at the intake manifold. Accordingly, the crankcase of the engine is occupied by an oil/air mixture. Further, it is important that no fuel is in the crankcase of this type of engine because JP5, unlike gasoline, does not readily evaporate from the oil. Further, the JP5 dilutes the engine oil and therefore reduces its life. Thus in accordance with the invention this problem is avoided by injecting all of the fuel into the cylinder head as described above.

What is claimed is:

1. In a two-stroke internal combustion engine adapted to run on a diesel or a kerosene type of fuel, and including a piston connected to the crankshaft of the engine to move within a cylinder through a first stroke from a top dead center position to a bottom dead center position and through a second stroke from the bottom dead center position back to said top dead center position, the improvement comprising:

means providing a cylinder head at the top end of the engine cylinder in the shape of an open bowl having a generally cup-shaped configuration including a sidewall portion, a spark plug positioned centrally within said bowl at the top end of the cylinder, and means for injecting fuel into the top end of said engine cylinder at a location between said spark plug and said sidewall portion, said fuel injecting means including an injection nozzle having a plurality of nozzle openings therein, said nozzle openings being constructed and arranged to discharge a plurality of plume-like sprays into the top end of the cylinder at a location within said bowl, two of said sprays being directed from said nozzle to diverge and pass along opposite sides of said spark plug, and additional sprays being directed from said nozzle against said sidewall portion or said cylinder head to be deflected therefrom back toward said piston and said spark plug to thereby form a cloud of fuel over said spark plug for good ignition.

2. In an internal combustion engine according to claim 1 wherein said sidewall portion of said cylinder head extends approximately parallel to the walls of the piston cylinder, and said additional sprays comprise two sprays which are directed to diverge from said nozzle in directions away from said spark plug toward said sidewall portion of said cylinder head to be deflected back therefrom.

3. In an internal combustion engine according to claim 2 wherein each of said four sprays of fuel is directed from said nozzle in a path approximately 90° from the adjacent sprays.

4. In an internal combustion engine according to claim 3 wherein said two sprays which are directed along opposite sides of said spark plug do not come into contact with said spark plug to thereby avoid wetting the same.

5. In an internal combustion engine according to claim 1 including means for timing the ignition of said spark plug during the movement of the piston through said strokes thereof, and means for timing the injection of the fuel during the movement of the piston through said strokes thereof, said ignition and injection timing means being operative during the starting of the engine to cause the injection of fuel to occur at about a crankshaft angle of 20°-25° before top dead center and the spark plug to ignite at a crankshaft angle of a few degrees before top dead center.

6. In an internal combustion engine according to claim 1 including means for timing the ignition of said spark plug during the movement of the piston through said strokes thereof, said ignition timing means being operative to produce a spark when the crankshaft angle is in the range of about 19°-20° before top dead center when the engine is operating at high speed, and means for timing the injection of the fuel during the movement of the piston through said strokes thereof, said injection timing means being operative to cause the injection of fuel to occur at about a crankshaft angle of 150°-180° before top dead center during operation of the engine at high speed.

7. In an internal combustion engine according to claim 6 wherein said ignition and injection timing means are operative during starting of the engine to cause the injection of fuel to occur at about a crankshaft angle of 20°-25° before top dead center and the spark plug to ignite at a crankshaft angle of a few degrees before top dead center.

8. In an internal combustion engine according to claim 1 including means for supplying air to said cylinder including an intake port means in the side of said cylinder and means for exhausting burned gases from said cylinder, including an exhaust port in the side of said cylinder opposite said intake port means, said injection nozzle being located on the side of said centrally located spark plug closest to said intake port means.

9. In an internal combustion engine according to claim 1 including means for supplying combustion air to said cylinder from said crankcase including an intake port in the side of said cylinder and a transfer port means interconnecting said crankcase and said intake port, said air supply to said cylinder being completely free of any combustion fuel, all of said fuel for combustion being supplied through said injection means.

10. In a two-stroke, two-cylinder internal combustion engine adapted to run on a diesel or a kerosene type of fuel, and including a piston connected to the crankshaft of the engine to move within each cylinder through a first stroke from a top dead center position to a bottom dead center position and through a second stroke from the bottom dead center position back to said top dead center position, the improvement wherein each of said cylinders comprises:

means providing a cylinder head at the top end of the engine cylinder in the shape of an open bowl having a generally cup-shaped configuration including a straight sidewall portion and a flat bottom portion, a spark plug positioned centrally within said bottom portion of said bowl at the top end of the cylinder, and means for injecting fuel into the top end of said engine cylinder at a location between said spark plug and said sidewall portion,
said fuel injecting means including
an injection nozzle having a plurality of nozzle openings therein,
said nozzle openings being constructed and arranged to discharge a plurality of plume-like sprays into the top end of the cylinder at a location within said bowl, two of said sprays being directed from said nozzle to diverge and pass along opposite sides of said spark plug, and additional sprays being directed from said nozzle against said sidewall portion of said cylinder head to be deflected therefrom back toward said piston and said spark plug to thereby form a cloud of fuel over said spark plug for good ignition.

* * * * *